(12) United States Patent
Chaturvedi et al.

(10) Patent No.: US 9,648,051 B2
(45) Date of Patent: *May 9, 2017

(54) SYSTEM AND METHOD FOR TRANSITIONING A COMMUNICATION SESSION BETWEEN NETWORKS THAT ARE NOT COMMONLY CONTROLLED

(71) Applicant: DAMAKA, INC., Richardson, TX (US)

(72) Inventors: Sivakumar Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/489,620

(22) Filed: Sep. 18, 2014

(65) Prior Publication Data

US 2015/0016421 A1 Jan. 15, 2015

Related U.S. Application Data

(63) Continuation of application No. 12/240,595, filed on Sep. 29, 2008, now Pat. No. 8,862,164.

(60) Provisional application No. 60/976,014, filed on Sep. 28, 2007.

(51) Int. Cl.
*H04L 29/06* (2006.01)
*H04W 76/04* (2009.01)
(Continued)

(52) U.S. Cl.
CPC ...... *H04L 65/1069* (2013.01); *H04L 65/1083* (2013.01); *H04W 76/04* (2013.01); *H04W 80/10* (2013.01); *H04W 88/06* (2013.01)

(58) Field of Classification Search
CPC . H04W 76/04; H04L 65/1083; H04L 65/1069
See application file for complete search history.

(56) References Cited

U.S. PATENT DOCUMENTS 5,442,637 A 8/1995 Nguyen
5,761,309 A 6/1998 Ohashi et al.
(Continued)

FOREIGN PATENT DOCUMENTS

EP 1404082 A2 3/2004
EP 160339 A1 12/2005
(Continued)

OTHER PUBLICATIONS

PCT: International Search Report and Written Opinion for PCT/US2011/024870; Oct. 26, 2011; 12 pages.
(Continued)

*Primary Examiner* — Anez Ebrahim
(74) *Attorney, Agent, or Firm* — Howison & Arnott, LLP

(57) ABSTRACT

Provided are a system and method for network transitions. In one example, the method includes receiving messages from a mobile device indicating that the mobile device is in a session initiation protocol (SIP) wireless hotspot and that the mobile device is engaged in a communication session via a cellular network while in the SIP wireless hotspot. The cellular network is instructed to add the mobile device to the communication session via the SIP wireless hotspot. An affirmative response is received from the cellular network and a third message is sent to the mobile device to notify the mobile device of the affirmative response.

18 Claims, 6 Drawing Sheets

(51) Int. Cl.
*H04W 80/10* (2009.01)
*H04W 88/06* (2009.01)

(56) References Cited

U.S. PATENT DOCUMENTS

| | | |
|---|---|---|
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,741,691 B1 | 5/2004 | Ritter et al. |
| 6,754,181 B1 | 6/2004 | Elliott et al. |
| 6,766,373 B1 | 7/2004 | Beadle et al. |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 | 10/2002 | Inbar et al. |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | LaVallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |

(56) References Cited

U.S. PATENT DOCUMENTS

| | | |
|---|---|---|
| 2004/0228279 A1 | 11/2004 | Midtun et al. |
| 2004/0240399 A1 | 12/2004 | Corrao et al. |
| 2004/0249953 A1 | 12/2004 | Fernandez et al. |
| 2004/0260952 A1 | 12/2004 | Newman et al. |
| 2004/0266426 A1* | 12/2004 | Marsh .............. H04W 36/0066 455/426.2 |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1* | 8/2006 | Morita ................ H04W 88/021 455/435.2 |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0135101 A1* | 6/2007 | Ramati ................ H04M 3/493 455/414.1 |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0250408 A1 | 10/2008 | Tsui et al. |
| 2008/0273541 A1 | 11/2008 | Pharn |
| 2008/0320096 A1 | 12/2008 | Szeto |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0145687 A1 | 6/2011 | Grigsby et al. |
| 2011/0314134 A1 | 12/2011 | Foti |
| 2012/0263144 A1 | 10/2012 | Nix |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |
| WO | 2006064047 A1 | 6/2006 |
| WO | WO 2006/075677 | 7/2006 |

OTHER PUBLICATIONS

J. Rosenberg et al. "Session Traversal Utilities for NAT (STUN)", draft—ietf—behave—rfc3489bis—06, Mar. 5, 2007.

PCT: International Search Report and Written Opinion for PCT/US2011/028685; Nov. 9, 2011; 10 pages.

PCT: International Search Report and Written Opinion for PCT/US2011/029954; Nov. 24, 2011; 8 pages.

(56) References Cited

OTHER PUBLICATIONS

PCT: International Search Report and Written Opinion for PCT/US2011/024891; Nov. 25, 2011; 9 pages.

PCT: International Search Report and Written Opinion for PCT/US2011/031245; Dec. 26, 2011; 13 pages.

Wireless Application Protocol—Wireless Transport Layer Security Specification, Version Feb. 18, 2000, Wireless Application Forum, Ltd. 2000; 99 pages.

PCT: International Search Report and Written Opinion for PCT/US2011/040864; Feb. 17, 2012; 8 pages.

PCT: International Search Report and Written Opinion for PCT/US2011/041565; Jan. 5, 2012; 7 pages.

PCT: International Search Report and Written Opinion for PCT/US2011/031246; Dec. 27, 2011; 8 pages.

PCT: International Search Report and Written Opinion for PCT/US2011/049000; Mar. 27, 2012; 10 pages.

PCT: International Search Report and Written Opinion for PCT/US2011/051877; Apr. 13, 2012; 7 pages.

PCT: International Search Report and Written Opinion for PCT/US2011/055101; May 22, 2012; 9 pages.

Balamurugan Karpagavinayagam et al. (Monitoring Architecture for Lawful Interception in VoIP Networks, ICIMP 2007, Aug. 24, 2008).

NiceLog User's Manual 385A0114-08 Rev. A2, Mar. 2004.

WISPA: Wireless Internet Service Providers Association; WISPA-CS-IPNA-2.0; May 1, 2009.

PCT: International Preliminary Report on Patentability of PCT/US2011/024870; Aug. 30, 2012; 7 pgs.

RFC 5694 ("Peer-to-Peer (P2P) Architecture: Definition, Taxonomies, Examples, and Applicability", Nov. 2009).

Mahy et al., The Session Initiation Protocol (SIP) "Replaces" Header, Sep. 2004, RFC 3891, pp. 1-16.

PCT: International Preliminary Report on Patentability of PCT/US2011/024891; Aug. 30, 2012; 6 pgs.

T. Dierks & E. Rescorla, The Transport Layer Security (TLS) Protocol (Ver. 1.2, Aug. 2008) retrieved at http://tools.ietf.org/htmllrfc5246. Relevant pages provided.

J. Rosenberg et al., SIP: Session Initiation Protocol (Jun. 2008) retrieved at http://tools.ietf.org/html/rfc3261. Relevant pages provided.

Philippe Bazot et al., Developing SIP and IP Multimedia Subsystem (IMS) Applications (Feb. 5, 2007) retrieved at redbooks IBM form No. SG24-7255-00. Relevant pages provided.

PCT: International Preliminary Report on Patentability of PCT/US2011/028685; Oct. 4, 2012; 6 pgs.

PCT: International Preliminary Report on Patentability of PCT/US2011/031245; Oct. 26, 2012; 9 pgs.

PCT: International Preliminary Report on Patentability of PCT/US2011/029954; Oct. 11, 2012; 5 pgs.

PCT: International Preliminary Report on Patentability of PCT/US2011/031246; Nov. 8, 2012; 5 pgs.

Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.

Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.

Cooper et al; "NAT Traversal for dSIP"; Feb. 25, 2007; IETF; IETF draft draft-matthews-p2psip-dsip-nat-traversal-00; pp. 1-23.

Cooper et al; "The Effect of NATs on P2PSIP Overlay Architecture"; IETF; IETF draft draft-matthews-p2psip-nats-and-overlays-01.txt; pp. 1-20.

Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.

PCT: International Search Report and Written Opinion for PCT/US2012/046026; Oct. 18, 2012; 6 pages.

Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.

PCT: International Preliminary Report on Patentability of PCT/US2011/040864; Jan. 3, 2013; 6 pgs.

PCT: International Preliminary Report on Patentability of PCT/US2011/041565; Jan. 10, 2013; 6 pgs.

PCT: International Preliminary Report on Patentability of PCT/US2011/049000; Feb. 26, 2013; 6 pgs.

PCT: International Preliminary Report on Patentability of PCT/US2011/051877; Mar. 26, 2013; 5 pgs.

PCT: International Preliminary Report on Patentability of PCT/US2011/055101; Apr. 16, 2013; 7 pgs.

PCT: International Preliminary Report on Patentability of PCT/US2012/046026; Jan. 30, 2014; 5 pgs.

Chathapuram, "Security in Peer-To-Peer Networks", Aug. 8, 2001, XP002251813.

International Search Report and Written Opinion of the International Searching Authority from PCT/IB2005/000821, dated Aug. 5, 2005.

International Search Report and Written Opinion of the International Searching Authority from PCT/US2006/032791, dated Dec. 18, 2006.

International Search Report and Written Opinion of the International Searching Authority from PCT/US2006/040312, dated Mar. 2, 2007.

International Search Report and Written Opinion of the International Searching Authority from PCT/US2006/047841, dated Sep. 12, 2008.

International Search Report and Written Opinion of the International Searching Authority from PCT/US2007/002424, dated Aug. 14, 2007.

International Search Report and Written Opinion of the International Searching Authority from PCT/US2007/068820, dated Jun. 11, 2008.

International Search Report and Written Opinion of the International Searching Authority from PCT/US2007/068821, dated Jun. 14, 2008.

International Search Report and Written Opinion of the International Searching Authority from PCT/US2007068823, dated Jun. 1, 2008.

Jeff Tyson, "How Instant Messaging Works", www.verizon.com/learningcenter, Mar. 9, 2005.

Rory Bland, et al,"P2P Routing" Mar. 2002.

Rosenberg, "STUN—Simple Traversal of UDP Through NAT", Sep. 2002, XP015005058.

Salman A. Baset, et al, "An Analysis of the Skype Peer-To-Peer Internet Telephony Protocol," Department of Computer Science, Columbia University, New York, NY, USA, Sep. 15, 2004.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "AII-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

(56) References Cited

OTHER PUBLICATIONS

International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
PCT: International Preliminary Report on Patentability of PCT/US2008/084950; Jun. 1, 2010; 5 pgs.
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.

\* cited by examiner

SYSTEM AND METHOD FOR TRANSITIONING A COMMUNICATION SESSION BETWEEN NETWORKS THAT ARE NOT COMMONLY CONTROLLED

CROSS-REFERENCE TO RELATED APPLICATIONS

This application is a continuation of U.S. patent application Ser. No. 12/240,595, filed Sep. 29, 2008, entitled SYSTEM AND METHOD FOR TRANSITIONING A COMMUNICATION SESSION BETWEEN NETWORKS THAT ARE NOT COMMONLY CONTROLLED, which claims benefit of U.S. Provisional Application No. 60/976,014, filed Sep. 28, 2007, entitled SYSTEM AND METHOD FOR TRANSITIONING A COMMUNICATION SESSION BETWEEN NETWORKS THAT ARE NOT COMMONLY CONTROLLED, the specifications of which are incorporated by reference herein in their entirety.

TECHNICAL FIELD

The present application incorporates the following applications by reference: U.S. patent application Ser. No. 11/214,648, filed on Aug. 30, 2005, which is a continuation-in-part of U.S. patent application Ser. No. 11/081,068, filed on Mar. 15, 2005, which claims the benefit of U.S. Provisional Patent Ser. Nos. 60/583,536, filed Jun. 29, 2004, 60/628,183, filed Nov. 15, 2004, and 60/628,291, filed Nov. 17, 2004.

BRIEF DESCRIPTION OF THE DRAWINGS

For a more complete understanding, reference is now made to the following description taken in conjunction with the accompanying Drawings in which.

DETAILED DESCRIPTION

Figure 1:
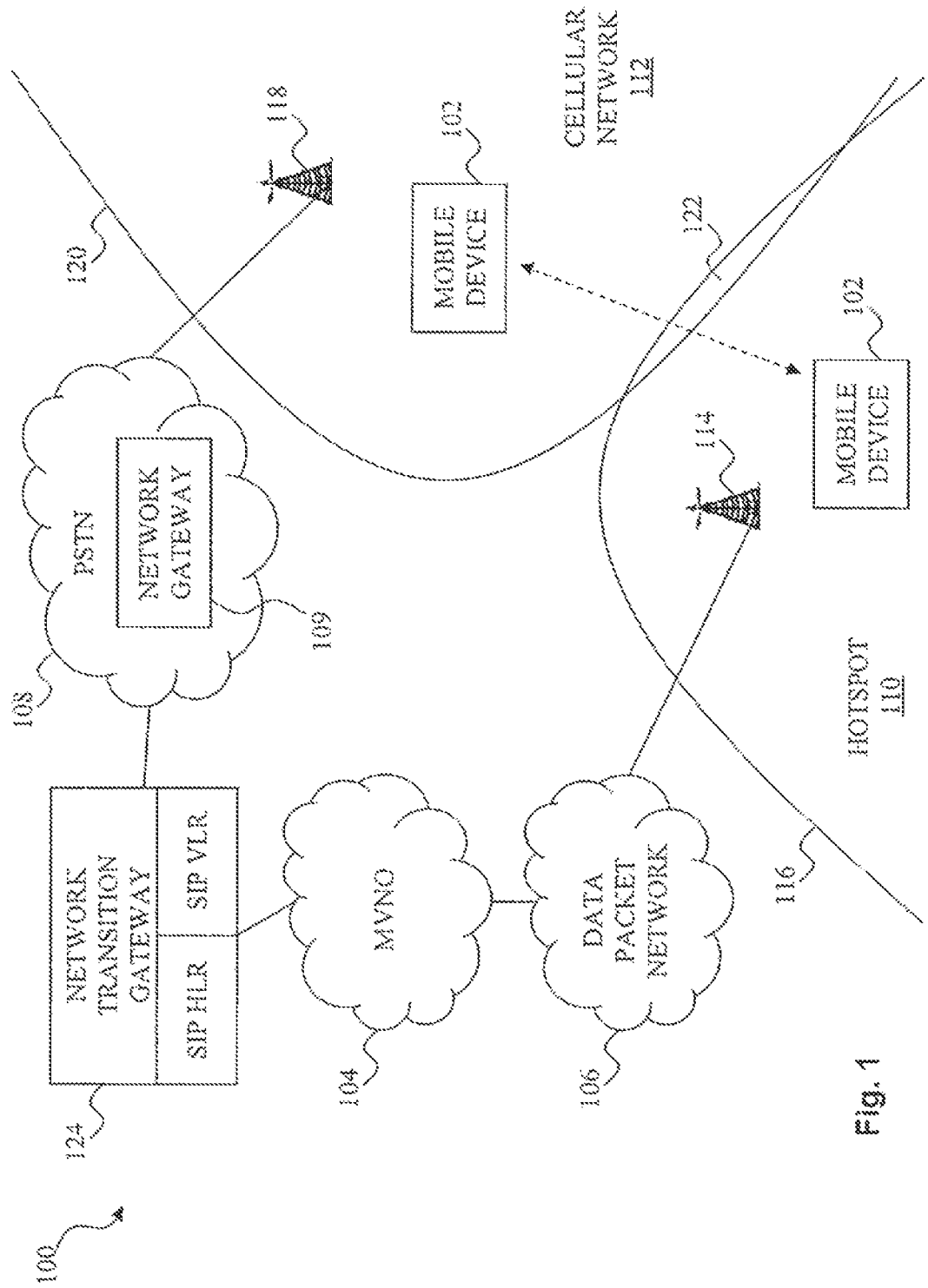
FIG. 1 is a diagram of one embodiment of a communications environment.

The present disclosure is directed to systems and methods for networked communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a communications environment 100 includes a mobile device 102 capable of wireless communications. The mobile device 102 may be any device capable of receiving and sending information via a wireless network, and may include processing capabilities to handle such information. Such devices include mobile computers, cell phones, personal digital assistants (PDAs), and pagers. In some embodiments, the mobile device 102 may be an endpoint as described in previously incorporated U.S. patent application Ser. No. 11/081,068. In the present example, the mobile device 102 has the capability to communicate via both Wi-Fi and cellular networks. For example, the mobile device 102 may include both a Wi-Fi interface and a cellular interface.

The environment 100 includes a mobile virtual network operator (MVNO) 104. The MVNO 104 may lease or otherwise license wireline and/or wireless bandwidth from companies who own such resources. Accordingly, the MVNO 104 may provide communication services to customers (e.g., the mobile device 102) using network resources not controlled by the MVNO itself, although some network resources may be controlled by the MVNO. Because of the license costs associated with leasing bandwidth from other providers, it may be expensive for the MVNO to provide access to networks that it does not control.

For purposes of example, the environment 100 also includes a data packet network 106 (e.g., the Internet), a public switched telephone network (PSTN) 108, a hotspot 110, and a cellular network 112. The hotspot 110 may use many different protocols to link the mobile device 102 to the data packet network 106. Exemplary network types for the hotspot 110 include wideband digital communication systems such as wireless local area networks (LANs) (e.g., IEEE 802.11a and 802.11g Wi-Fi networks) and WiMax wireless metropolitan area networks (MANs) (e.g., IEEE 802.16 networks). The PSTN 108 may provide SS7 and/or TDM functionality, and may also provide trunk line access for MVNO 104 in some embodiments. Generally, the PSTN 108 may use the cellular network 112 to provide mobility to users. The PSTN 108 may include one or more network gateways, which are referred to herein interchangeably with the PSTN. The cellular network 112 may represent many different cellular communication systems, including Global System for Mobile communications (GSM) and/or code division multiple access (CDMA) systems. In some embodiments, one or more of the networks 106, 108, 110, and 112 may include hybrid peer-to-peer network functionality as described in previously incorporated U.S. patent application Ser. No. 11/081,068.

The hotspot 110 may include an access point 114 that provides wireless access to an area defined, for purposes of example, by boundary 116 and is coupled to data packet network 106. The cellular network 112 may include a base station 118 that provides wireless access to an area defined, for purposes of example, by boundary 120 and is coupled to PSTN 108. It is understood that both the hotspot 110 and cellular network 112 may have additional components (e.g., home location registers (HLRs), visitor location registers (VLRs), mobile switching centers (MSCs), and base station controllers (BSCs)) that are not shown in FIG. 1. An overlapping zone 122 represents an area where the hotspot 110 and cellular network 112 overlap and where the mobile device 102 has access to both. It is understood that the shape and size of the areas covered by the hotspot 110, cellular network 112, and zone 122 are for purposes of illustration only and may differ greatly from those shown.

The environment 100 also includes a network transition gateway 124 that is under the control of the MVNO 104. It is understood that the MVNO 104 may or may not own or otherwise operate the network transition gateway 124, but may have a certain amount of control over the gateway with respect to customers of the MVNO. In the present example, the network transition gateway 124 is positioned between the MVNO 104 and the PSTN 108 and forms the outer boundary of the MVNO's control. In other embodiments, the MVNO's control may extend to other networks, such as the PSTN 108 (or other networks taking the place of the PSTN in FIG. 1). Accordingly, in the present embodiment, the MVNO 104 is not able to perform call setup or routing actions in the cellular network, but can only send a request to the cellular network to establish, breakdown, or route a call. Due to the cost issues of leasing bandwidth from the cellular network 112, the MVNO 104 may desire to minimize its customers use of the cellular network and so may desire to route calls through other channels (e.g., the hotspot 110) whenever possible.

The network transition gateway 124 may include HLR and/or VLR functionality from a Session Initiation Protocol (SIP) perspective. For example, the network transition gateway 124 may have a list of all mobile devices belonging to customers of the MVNO 104 in the HLR and corresponding SIP information. For example, the HLR may include a SIP address for the mobile device 102 (e.g., john@sip.mvno.com) that is cross referenced to the phone number of the mobile device (e.g., 972-555-1212). This cross referencing enables the network transition gateway 124 to move between SIP messaging and phone communications with respect to the mobile device 102 as will be described below in greater detail. The network transition gateway 124 may also include VLR functionality that registers the mobile device's presence when the mobile device 102 enters the hotspot 110 and is available for SIP messaging. When the mobile device 102 leaves the hotspot 110 or is turned off, its entry in the VLR is removed to indicate that the mobile device is not available for SIP messaging. The network transition gateway 124 may also include other routing and control elements that are not SIP based. It is understood that the SIP VLR and SIP HLR functionality, as well as the other routing and control elements of the network transition gateway 124, may be located elsewhere in other embodiments. Non-MVNO networks, such as the cellular network 112, may be instructed to route all call requests initiated by subscribers of the MVNO to an aggregator within the MVNO, such as the network transition gateway 124.

Accordingly, the MVNO 104 may use functionality provided by the network transition gateway 124 to determine how to service a communication session (e.g., a phone call or data transfer) and to perform transitions between networks when needed. In the present example, the network transition gateway 124 remains in control of the communication session for the duration of the session regardless of the network used by the mobile device 104. It is noted that this includes calls initiated by the mobile device 104 in the cellular network 112 even though the MVNO 104 has no control over the cellular network, as the network transition gateway 124 functions as a bridge to the cellular network 112 for calls that use the cellular network.

The mobile device 102 may be involved in a number of scenarios that may be viewed based on the accessibility of the hotspot 110 and cellular network 112. As a general rule, when the hotspot is available, the mobile device 102 is routed through the hotspot rather than the cellular network 112.

Figure 2:
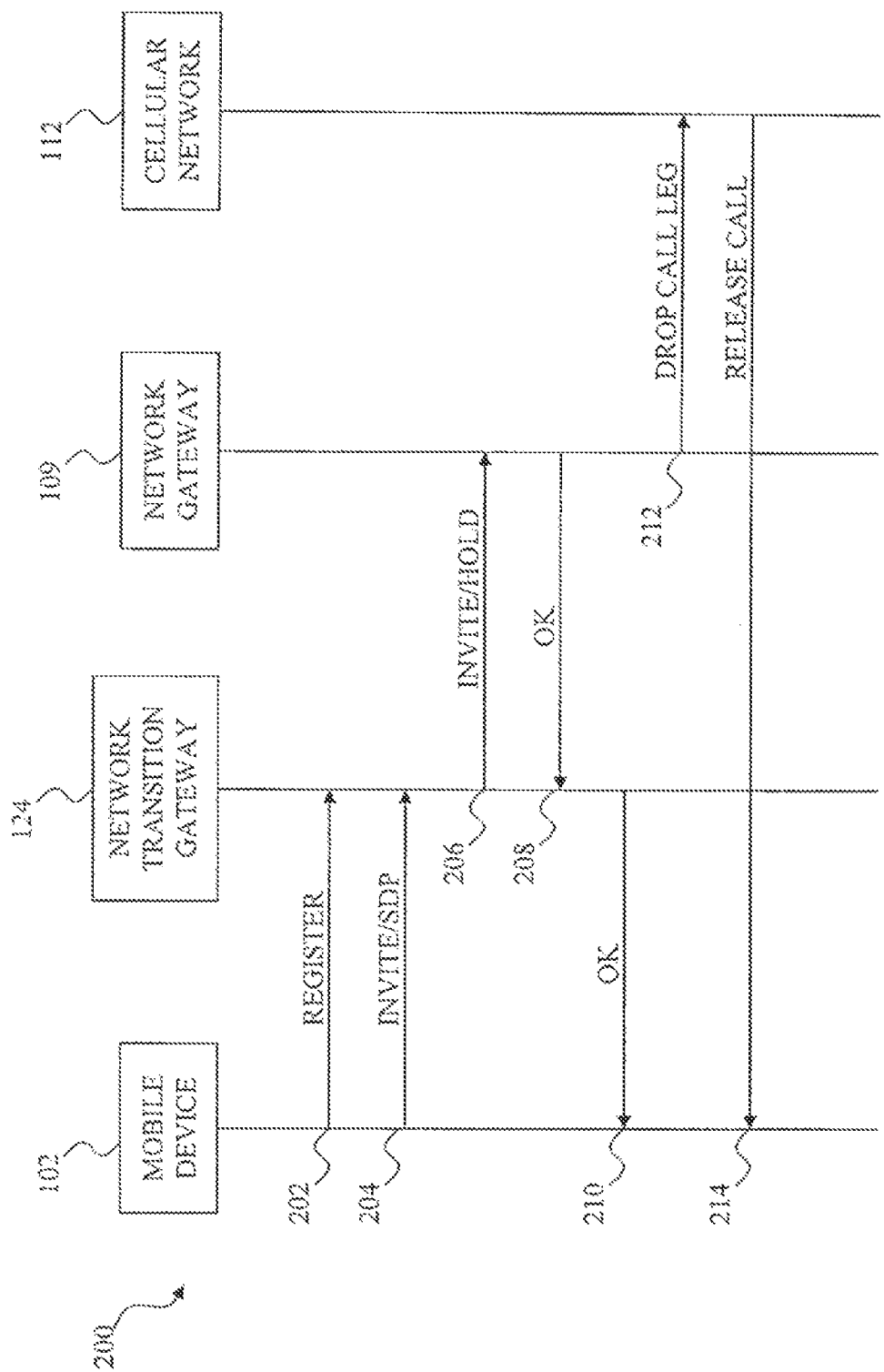
FIG. 2 is a sequence diagram illustrating one embodiment of a message flow that may be used to transition a communication session from a cellular network to a hotspot within the environment of FIG. 1.

Referring to FIG. 2, in one embodiment, a sequence diagram 200 illustrates a sequence of messages that may occur when the mobile device 102 is originally serviced by the cellular network 112 and moves into a location where it can be serviced by the hotspot 110. In the present example, the mobile device 102 has a current call that was established and serviced by the cellular network 112. As the mobile device 102 is now located in the hotspot 110, it is desirable to switch the call to the hotspot 110. Accordingly, the mobile device 102 may contain software that identifies the accessibility of the hotspot 110, identifies the ongoing call, and communicates these facts to the network transition gateway 124.

Although not shown, to initiate the call in the cellular network 112, the mobile device 102 sends a call setup request to the cellular network as would ordinarily occur. For example, an MSC in the cellular network 112 may receive the call request and look up the subscriber ID associated with the mobile device. Due to instructions by the MVNO, the MSC will identify that all calls initiated by mobile devices with subscriber IDs identifying them as MVNO subscribers are to be routed to an aggregator (e.g., the network transition gateway 124) without any other action being taken (e.g., the MSC is to route the request and should not set up the call itself). Accordingly, the MSC will route the call request to the network transition gateway 124, which may then determine how to set up the call. It is noted that if the call is terminated to a subscriber within the cellular network 112, the network transition gateway 124 may communicate with the cellular network to establish the second leg of the call between the network transition gateway and the cellular network, but does not relinquish control of the first call leg. This enables the network transition gateway 124 to maintain control of the call even when the call originates and terminates within the cellular network 112.

In step 202, once the mobile device 102 enters the hotspot 110, the mobile device registers with the network transition gateway 124, which may enter the mobile device 102 into the SIP VLR. The registration message from the mobile device 102 notifies the network transition gateway 124 of the presence of the mobile device in a SIP messaging environment. The present disclosure, both in the current embodiment and following embodiments, refers to various messages. It is understood that these are simply examples and are not intended to limit the disclosure to the particular messages described. In step 204, the mobile device 102 sends an INVITE/SDP message to notify the network transition gateway 124 that there is an ongoing call and to provide information to the network transition gateway regarding the call.

In step 206, the network transition gateway 124 sends an INVITE message to the PSTN 108 (e.g., to a network gateway 109 within the PSTN 108) requesting that the PSTN add the mobile device 102 to the call (via the hotspot 110). The INVITE may include additional information, such as a hold request to inform the PSTN 108 that it is to hold the call. In step 208, the PSTN network gateway 109 responds to the network transition gateway 124, which in turn responds to the mobile device 102 in step 210. In step 212, the PSTN network gateway 109 instructs the cellular network 112 to drop the call and, in step 214, the cellular network drops its leg of the call with the mobile device 102 and ceases its participation.

Accordingly, although the call was initially serviced using a call leg between the mobile device 102 and the cellular network 112, the call is moved from the cellular network to a Wi-Fi connection via the hotspot 110. Before, during, and after the transition, the call is controlled by the MVNO via the network transition gateway 124.

Figure 3:
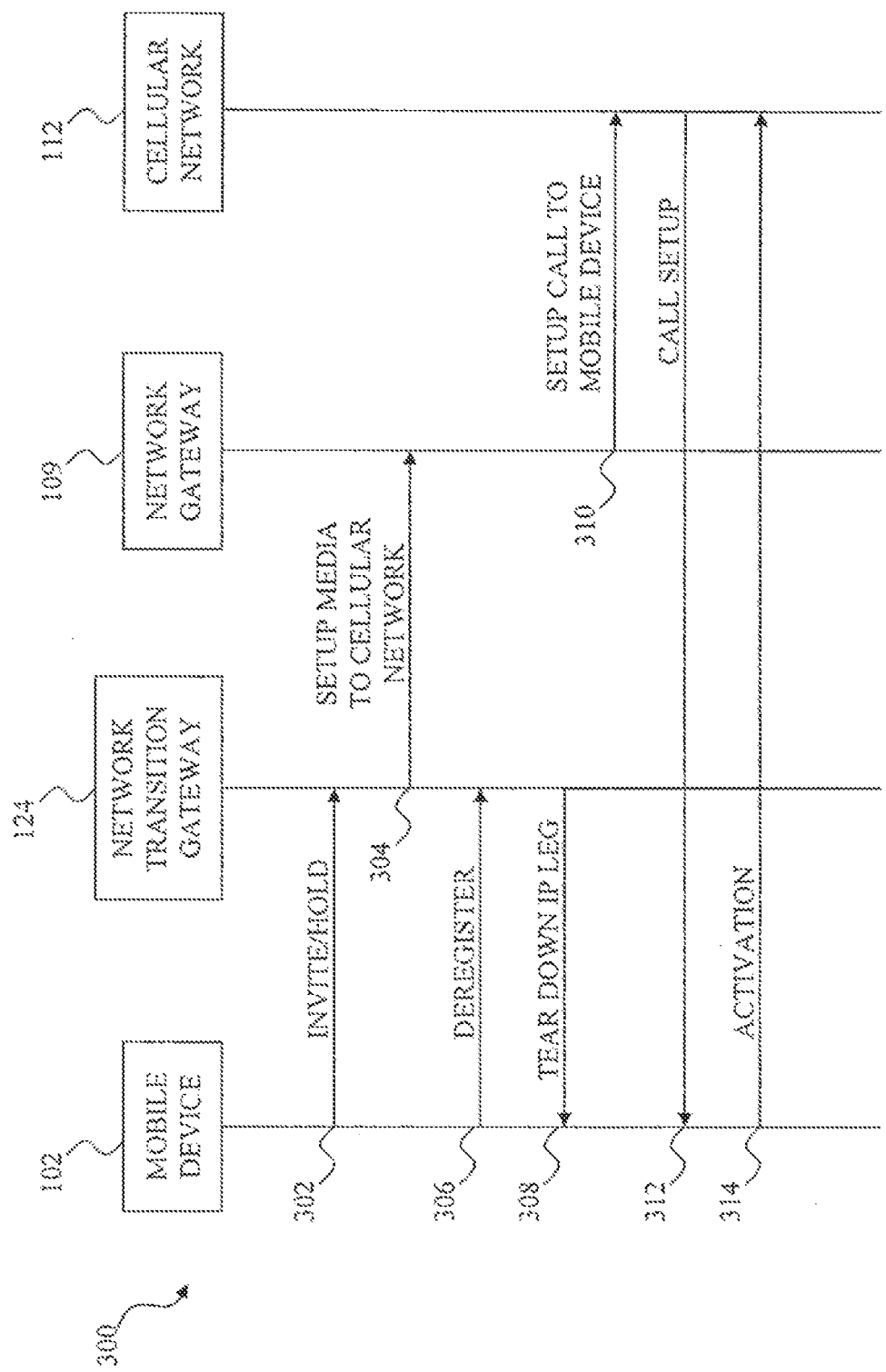
FIG. 3 is a sequence diagram illustrating one embodiment of a message flow that may be used to transition a communication session from a hotspot to a cellular network within the environment of FIG. 1.

Referring to FIG. 3, in another embodiment, a sequence diagram 300 illustrates a sequence of messages that may occur when the mobile device 102 is originally serviced by the hotspot 110 and moves into a location where it can be serviced by the cellular network 112 but not the hotspot 110. In the present example, the mobile device 102 has a current call that was established and serviced via the hotspot 110. As the mobile device 102 is now leaving the coverage area of the hotspot 110, it is desirable to switch the call to the cellular network 110.

Accordingly, the mobile device 102 may contain software that identifies that it is leaving the hotspot 110 (e.g., due to location information or loss of signal strength) and may send an INVITE message with hold information to the network transition gateway 124 in step 302. The network transition gateway 124 may be configured to interpret the hold as indicating that the mobile device 102 is moving out of the hotspot 110 and/or into the cellular network 112.

In step 304, the network transition gateway 124 sends a request to the PSTN gateway to perform a call setup from the mobile device 102 via the network transition gateway 124 to the cellular network. In step 306, the mobile device 102 may send a message to the network transition gateway 124 to deregister from the network transition gateway. The network transition gateway 124 may then remove the mobile device 102 from the SIP VLR and tear down the IP channel supporting the initial call leg to the mobile device 102 in step 308.

In step 310, the PSTN network gateway 109 sends a setup request to the cellular network 112 to set up a call for the mobile device 102 and, in step 312, the cellular network establishes the connection with the mobile device. In step 314, the mobile device 102 may send information, such as dual tone multi frequency (DTMF) trigger information, to the cellular network 112 to inform the cellular network that the mobile device has switched over to the cellular network. For example, the mobile device 102 may request that its user press a key that is then sent to the cellular network 112 or the mobile device may automatically send such information to the cellular network.

Accordingly, although the call was initially serviced by a call leg between the hotspot 110 and the mobile device 102, the call is moved from the hotspot to a cellular connection via the cellular network 112. Before, during, and after the transition, the call is controlled by the MVNO via the network transition gateway 124.

It is understood that the actual transition process may vary depending on the capabilities of the mobile device 102. For example, the mobile device 102 may have the capability to handle simultaneous connections via its Wi-Fi and cellular interfaces. In this case, the mobile device 102 may put one call leg on hold, set up another call leg, and then join the legs before dropping the initial leg. In such scenarios, the initial call leg may not be broken down before the next leg is established. Accordingly, the actual process used to transition the mobile device 102 from the hotspot 110 to the cellular network 112 or vice versa may depend on the mobile device itself. However, regardless of the capabilities of the mobile device 102, the MVNO maintains control of the call before, during, and after the transition, via the network transition gateway 124.

Although only transitions between the hotspot 110 and the cellular network 112 are illustrated, it is understood that the network transition gateway 124 may handle network transitions between other types of networks supported by the mobile device 102. For example, the network transition gateway 124 may be configured to locate a route for a call based on cost and/or other factors and may handle whatever network transitions are needed to setup the call using the located route.

It is understood that both incoming and outgoing call involving the mobile device 102 may be controlled by the network transition gateway 124 regardless of whether the mobile device is using the hotspot 110 or the cellular network 112. Once the call is established, the mobile device 102 may move between the cellular network 112 and the hotspot 110 with the network transition gateway 124 handling the establishment and tear down of call legs as needed.

Figure 4:
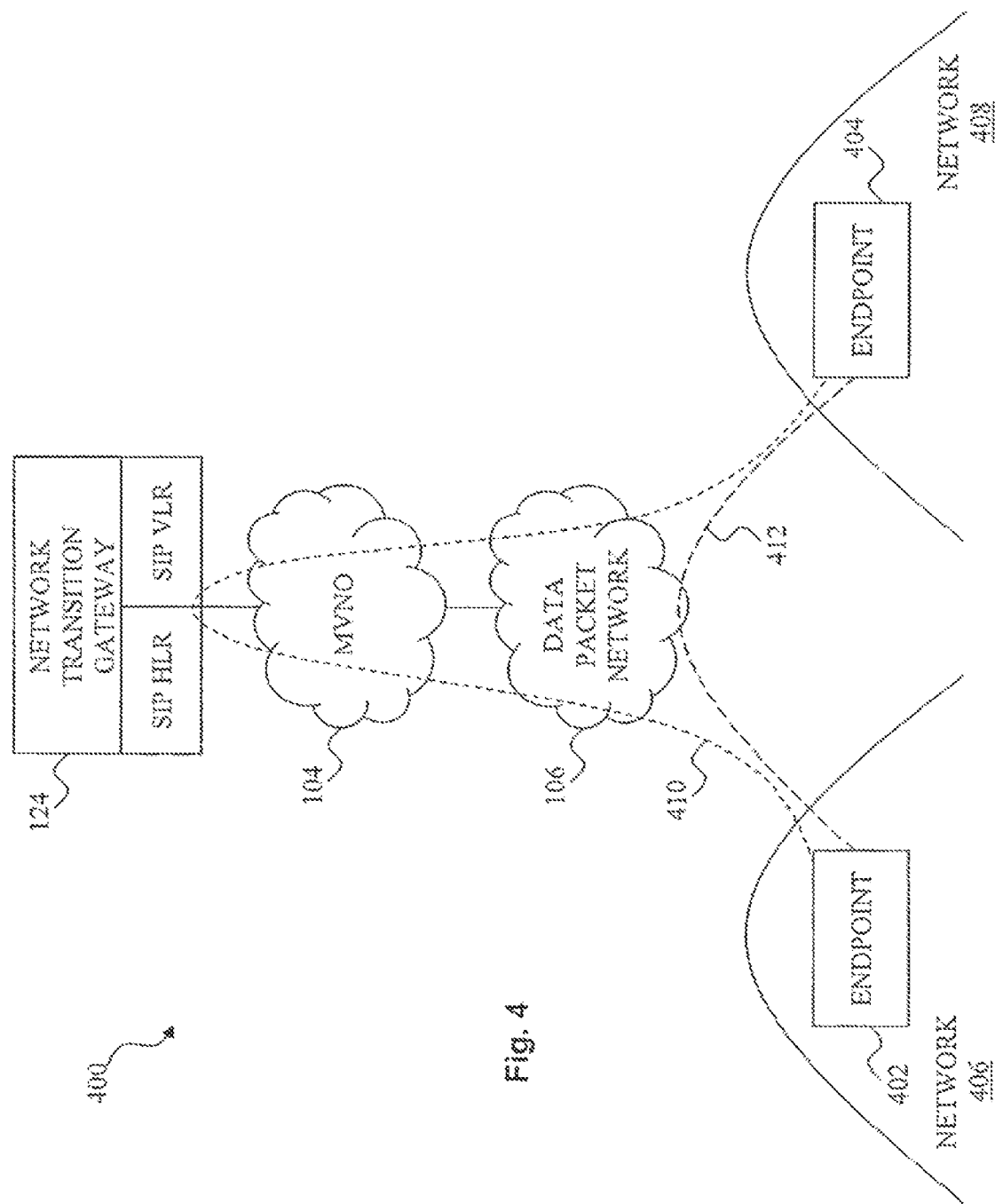
FIG. 4 is a diagram of another embodiment of a communications environment.

Referring to FIG. 4, in yet another embodiment, two endpoints 402 and 404 are located in networks 406 and 408, respectively. The networks 406 and 408 (which may be a single network in some embodiments) are controlled by MVNO 104. The endpoints may be similar or identical to those described in previously incorporated U.S. patent application Ser. No. 11/081,068. One or both of the endpoints 402 and 406 may be mobile devices as previously described. Although not shown, other network components (e.g., an access server and a STUN server as described in U.S. patent application Ser. No. 11/081,068) may be included in the MVNO 104 to handle the endpoints 402 and 404. For example, access server functionality may be included in the network transition gateway 124 or provided by a separate server.

In the present example, signaling between the endpoints may be handled by the network transition gateway 124 as previously described. However, due to the peer-to-peer functionality of the endpoints 402 and 404, the two endpoints may establish a direct media path through the data packet network 106 that does not go through the MVNO 104 or network transition gateway 124. This peer-to-peer process is described in detail in U.S. patent application Ser. No. 11/081,068.

Figure 5:
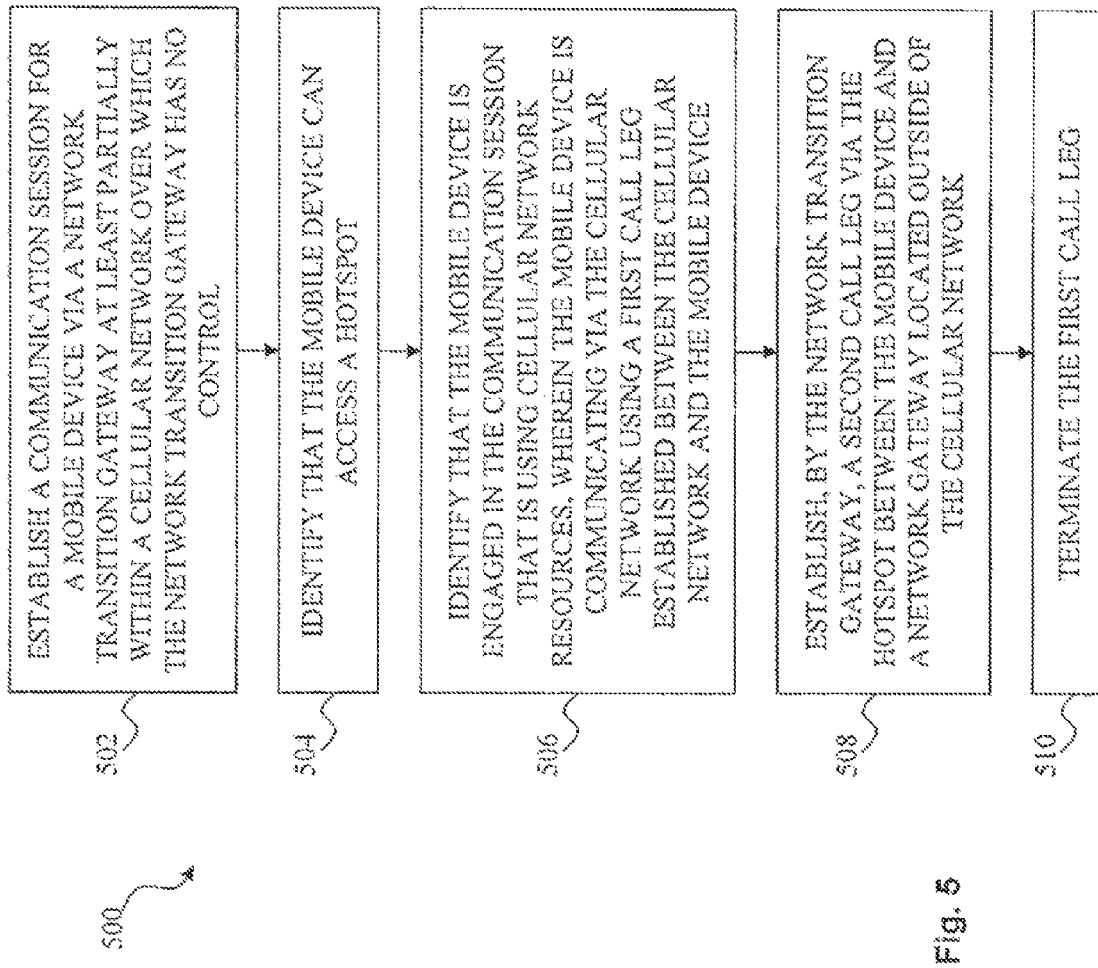
FIG. 5 is a flow chart illustrating one embodiment of a method that may be used to transition a communication session from a cellular network to a hotspot within the environment of FIG. 1.

Referring to FIG. 5, in yet another embodiment, a method 500 may be used to transition a mobile device (e.g., the mobile device 102 of FIG. 1) from a cellular network (e.g., the cellular network 112 of FIG. 1) to a hotspot (e.g., the hotspot 110 of FIG. 1). In step 502, a communication session may be established for the mobile device 102 via a network transition gateway (e.g., the network transition gateway 124 of FIG. 1), where the call is initially established at least partially within the cellular network 112 where the network transition gateway has no control. In step 504, the method 500 identifies that the mobile device 102 can access the hotspot 110 and, in step 506, identifies that the mobile device is currently engaged in the communication session that is using cellular network resources, where the mobile device is communicating via the cellular network 112 using a first call leg established between the mobile device and the cellular network. In step 508, the network transition gateway 124 establishes a second call leg via the hotspot 110 between the mobile device 102 and a network gateway (e.g., a network gateway in the PSTN 108) located outside of the cellular network 112 and, in step 510, terminates the first call leg. It is understood that the network transition gateway 124 may simply initiate certain actions, such as terminating the first call leg, and may not perform the termination itself.

Figure 6:
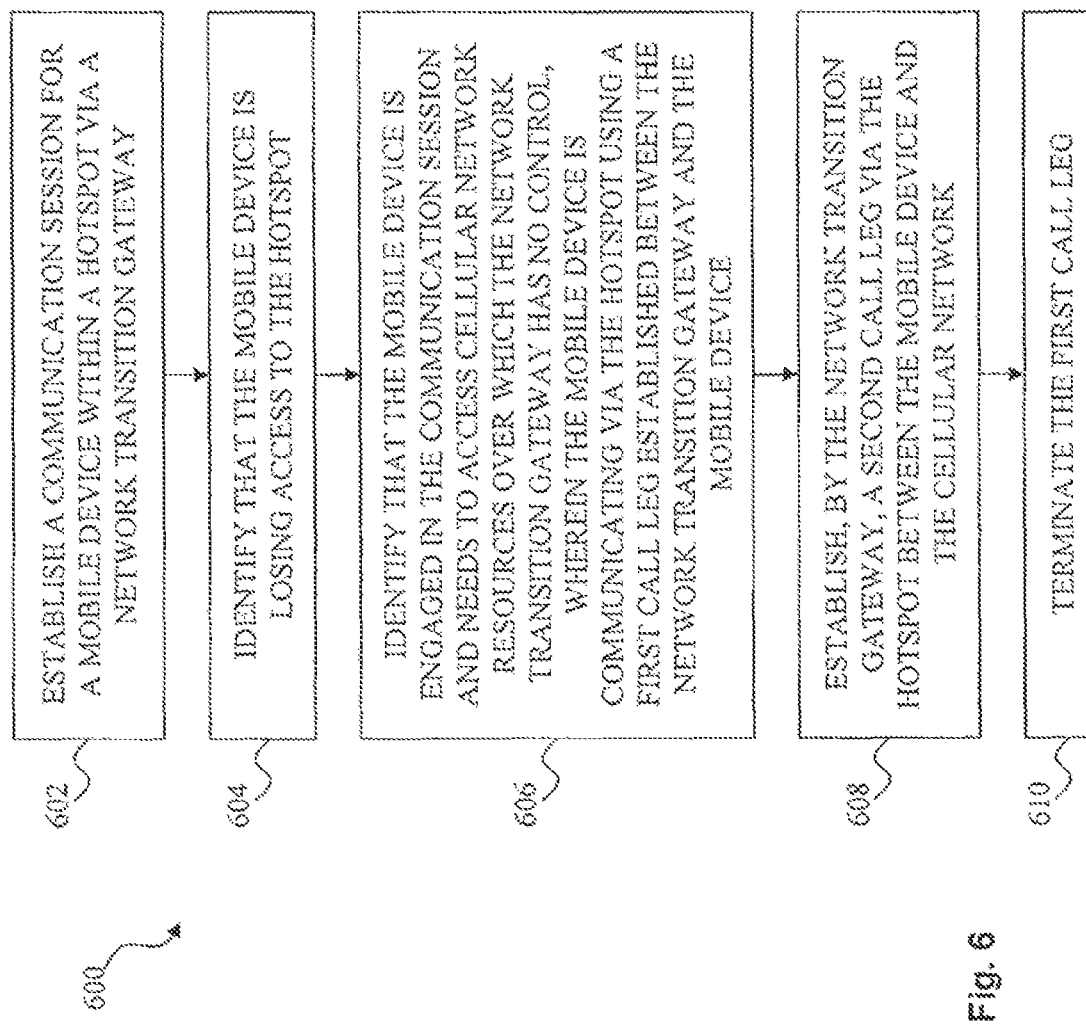
FIG. 6 is a flow chart illustrating one embodiment of a method that may be used to transition a communication session from a hotspot to a cellular network within the environment of FIG. 1.

Referring to FIG. 6, in yet another embodiment, a method 600 may be used to transition a mobile device (e.g., the mobile device 102 of FIG. 1) from a hotspot (e.g., the hotspot 110 of FIG. 1) to a cellular network (e.g., the cellular network 112 of FIG. 1). In step 602, a communication session is established for the mobile device 102 within the hotspot 110 via a network transition gateway (e.g., the network transition gateway 124 of FIG. 1). In step 604, the method 600 identifies that the mobile device 102 is losing access to the hotspot 110 and, in step 606, identifies that the mobile device is currently engaged in the communication session and needs to access cellular network resources over which the network transition gateway 124 has no control, where the mobile device is communicating via the hotspot using a first call leg established between the network transition gateway and the mobile device. In step 608, the network transition gateway 124 establishes a second call leg between the mobile device 102 and the cellular network 112, where the second call leg passes through the network transition device. In step 610, the first call leg is terminated. It is understood that the network transition gateway may simply initiate certain actions, such as terminating the first call leg, and may not perform the termination itself.

While the preceding description shows and describes one or more embodiments, it will be understood by those skilled in the art that various changes in form and detail may be made therein without departing from the spirit and scope of the present disclosure. For example, various steps illustrated within a particular sequence diagram may be combined or further divided, and some steps may be performed in a different order than that shown. In addition, steps described in one diagram may be incorporated into another diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method comprising:
receiving, by a network transition gateway, a first message from a mobile device indicating that the mobile device is in a session initiation protocol (SIP) wireless hotspot, wherein the first message is received directly from the mobile device by the network transition gateway and does not pass through a cellular network;
receiving, by the network transition gateway, a second message from the mobile device indicating that the mobile device is engaged in a communication session with a second device using a first call leg via the cellular network while in the SIP wireless hotspot, wherein the second message is received directly from the mobile device by the network transition gateway and does not pass through the cellular network, and wherein the network transition gateway has no control over the cellular network and wherein the network transition gateway is configured to send only requests for establishing, routing, and breaking down a call to the cellular network;
requesting, by the network transition gateway, that a public switched telephone network (PSTN) gateway add the mobile device to the communication session using a second call leg via the SIP wireless hotspot and terminate the first call leg, wherein the PSTN gateway is separate from the cellular network;
receiving, by the network transition gateway, an affirmative response from the PSTN gateway; and
sending, by the network transition gateway, a third message to the mobile device to notify the mobile device of the affirmative response.

2. The method of claim 1 further comprising:
receiving a fourth message from the cellular network via the PSTN gateway indicating that the mobile device has requested that the cellular network establish the communication session;
determining that the mobile device is attempting to establish the communication session with a user within the cellular network;
establishing a third call leg with the user via the cellular network;
establishing the first call leg with the mobile device via the cellular network; and
joining the third and second call legs to establish the communication session.

3. The method of claim 1 further comprising instructing the PSTN gateway to place the communication session on hold until the mobile device is added to the communication session via the SIP wireless hotspot.

4. The method of claim 1 further comprising:
receiving, by the network transition gateway, a fourth message from the mobile device indicating that it is leaving the SIP wireless hotspot and is engaged in the communication session; and
sending, by the network transition gateway, a request message to the cellular network via the PSTN gateway to set up a communication channel with the mobile device to continue the communication session via the cellular network, wherein the network transition gateway maintains control of the communication session after the mobile device transitions to the cellular network over which the network transition gateway has no control, and wherein the second call leg is terminated.

5. The method of claim 1 further comprising adding, by the network transition gateway, the mobile device to a visitor location register (VLR) of the network transition gateway to indicate that the mobile device is in the SIP wireless hotspot after receiving the second message.

6. The method of claim 1 wherein signaling between the mobile device and the second device for the communication session passes through the network transition gateway and wherein data for the communication session passes directly between the mobile device and the second device without passing through the network transition gateway.

7. A method for execution on a mobile device comprising:
maintaining, by the mobile device, a communication session with a second device via a first call leg over a cellular network;
detecting, by the mobile device, the presence of a Session Initiation Protocol (SIP) wireless hotspot while the communication session is being maintained;
notifying, by the mobile device, a network transition gateway of the presence of the SIP wireless hotspot and the communication session being maintained;
receiving, by the mobile device, instructions from the network transition gateway to establish a second call leg with a public switched telephone network (PSTN) gateway via the SIP wireless hotspot;
establishing, by the mobile device, the second call leg; and continuing, by the mobile device, the communication session via the second call leg over the SIP wireless hotspot, wherein signaling between the mobile device and the second device passes through the network transition gateway and wherein data between the mobile device and the second device is peer-to-peer and does not pass through the network transition gateway.

8. The method of claim 7 further comprising joining the first and second call legs.

9. The method of claim 7 further comprising terminating the first call leg after establishing the second call leg.

10. The method of claim 7 further comprising:
sending a request to the cellular network to establish the communication session;
receiving call setup information from the network transition gateway; and
responding to the call setup information to establish the communication session with the cellular network via the network transition gateway.

11. The method of claim 7 further comprising:
sending a request to the cellular network to establish the communication session;
receiving call setup information from the cellular network; and
responding to the call setup information to establish the communication session with the cellular network.

12. The method of claim 11 further comprising sending dual tone multi frequency (DTMF) trigger information to the cellular network to inform the cellular network that the mobile device has switched to the cellular network.

13. The method of claim 6 further comprising:
performing an authentication process with an access server;
obtaining, following the authentication process, a profile containing a list of devices of that are currently available to communicate with the mobile device, wherein each of the devices on the list has previously granted the mobile device permission to communicate with that device and wherein the second device is on the list of devices; and
prior to maintaining the communication session, sending the second device a notification message after obtaining the profile, wherein the notification message informs the second device that the mobile device is available.

14. A method comprising:
receiving, by a network transition gateway via a public switched telephone network (PSTN) gateway, a first message from a cellular network indicating that a mobile first device has sent a call setup request to the cellular network for a communication session with a second device, wherein the network transition has no control over the cellular network;
communicating, by the network transition gateway via the PSTN gateway, with the cellular network to establish the call for the first device via the cellular network using a first call leg between the first device and the cellular network, wherein the network transition gateway maintains a second call leg with the cellular network for signaling to control the communication session, and wherein the network transition gateway is configured to send only requests for establishing, routing, and breaking down a call to the cellular network;
receiving, by the network transition gateway, a second message from the first device indicating that the first device has entered a SIP wireless hotspot, wherein the second message is received while the communication session is maintained through the cellular network;
entering, by the network transition gateway, the first device in a register of the network transition gateway to indicate that the first device is in the SIP wireless hotspot; and
sending, by the network transition gateway to the PSTN gateway, a third message requesting that the PSTN gateway add the first device to the call by establishing a third call leg with the first device via the SIP wireless hotspot and that the first call leg between the first device and the cellular network be terminated, wherein the network transition gateway maintains control of the call after the call is moved from the cellular network to the SIP wireless hotspot.

15. The method of claim 14 wherein signaling by the first and second devices for the communication session passes through the network transition gateway and wherein data for the communication session passes directly between the first and second devices without passing through the network transition gateway.

16. The method of claim 14 wherein both signaling and data for the communication session passes through the network transition gateway.

17. The method of claim 14 further comprising
receiving, by the network transition gateway, a third message from the first device indicating that the first device is leaving the SIP wireless hotspot;
communicating, by the network transition gateway via the PSTN gateway, with the cellular network to maintain the call for the first mobile device via the cellular network using a fourth call leg between the first device and the cellular network, wherein the network transition gateway maintains control of the communication session after the call is moved;
removing, by the network transition gateway, the first device from the register of the network transition gateway to indicate that the first device is not in a SIP wireless hotspot; and
instructing, by the network transition gateway, the first device to tear down the third call leg with the SIP wireless hotspot.

18. The method of claim 14 wherein the sending, by the network transition gateway to the PSTN gateway, the third message requesting that the PSTN gateway add the first device to the call includes requesting that the PSTN gateway place the call on hold.

* * * * *